(12) United States Patent
Brookes

(10) Patent No.: US 11,673,660 B1
(45) Date of Patent: Jun. 13, 2023

(54) SYSTEMS AND DEVICES FOR PARKING A PROPULSOR TEETER

(71) Applicant: BETA AIR, LLC, South Burlington, VT (US)

(72) Inventor: Kyle Brookes, South Burlington, VT (US)

(73) Assignee: BETA AIR, LLC, South Burlington, VT (US)

(*) Notice: Subject to any disclaimer, the term of this patent is extended or adjusted under 35 U.S.C. 154(b) by 0 days.

(21) Appl. No.: 17/824,309

(22) Filed: May 25, 2022

(51) Int. Cl.
*B64C 27/54* (2006.01)
*B64C 29/00* (2006.01)

(52) U.S. Cl.
CPC .......... *B64C 27/54* (2013.01); *B64C 29/0008* (2013.01)

(58) Field of Classification Search
CPC ............................ B64C 27/54; B64C 29/0008
USPC ...................................................... 416/169 r
See application file for complete search history.

(56) References Cited

U.S. PATENT DOCUMENTS

| | | | |
|---|---|---|---|
| 2,549,887 A | 4/1951 | Buivid | |
| 2,669,311 A * | 2/1954 | De Lagrevol | B64C 11/346 416/51 |
| 3,135,334 A * | 6/1964 | Culver | B64C 27/54 416/135 |
| 3,246,862 A * | 4/1966 | Culver | B64C 27/72 416/162 |
| 3,370,809 A * | 2/1968 | Leoni | B64C 29/0033 416/246 |
| 3,762,667 A | 10/1973 | Pender | |
| 4,310,284 A * | 1/1982 | Randolph | F03D 7/0224 416/41 |
| 4,443,154 A * | 4/1984 | Randolph | F03D 7/0224 416/11 |
| 5,032,057 A * | 7/1991 | Speer | B63H 3/008 416/53 |
| 5,259,729 A * | 11/1993 | Fujihira | A63H 27/12 416/61 |
| 5,304,036 A * | 4/1994 | Groen | B64C 27/021 416/102 |

(Continued)

FOREIGN PATENT DOCUMENTS

| | | |
|---|---|---|
| GB | 886582 A | 1/1962 |
| WO | 2021030630 | 2/2021 |

OTHER PUBLICATIONS

Paul Dvorak, Teeter bearing help wind turbines Sssssssh, Jul. 18, 2009.

*Primary Examiner* — Logan M Kraft
*Assistant Examiner* — John D Bailey
(74) *Attorney, Agent, or Firm* — Caldwell Intellectual Property Law

(57) ABSTRACT

A parking system for a propulsor teeter of an aircraft is disclosed. The system includes a propulsor including a hub. The hub is mechanically connected to a rotor, wherein the hub is configured to rotate about a rotational axis. A teeter mechanism is connected to the hub, wherein the teeter mechanism is configured to permit a propulsor plane of the propulsor to pivot with respect to a point of intersection between the propulsor plane and the rotational axis of the propulsor. A locking mechanism is configured to selectively lock the teeter mechanism while the aircraft is in flight, wherein selectively locking the teeter mechanism restricts the pivoting of the propulsor plane.

18 Claims, 10 Drawing Sheets

(56) References Cited

U.S. PATENT DOCUMENTS

| | | | |
|---|---|---|---|
| 5,433,669 A * | 7/1995 | Chang | A63H 27/04 |
| | | | 472/6 |
| 6,764,280 B2 | 7/2004 | Sehgal et al. | |
| 7,677,862 B2 | 3/2010 | Boatner | |
| 7,789,341 B2 * | 9/2010 | Arlton | B64C 27/22 |
| | | | 244/6 |
| 8,047,792 B2 | 11/2011 | Bech et al. | |
| 8,070,090 B2 | 12/2011 | Tayman | |
| 8,109,722 B2 | 2/2012 | Gamble et al. | |
| 9,126,681 B1 * | 9/2015 | Judge | B64C 27/022 |
| 10,384,771 B2 | 8/2019 | Haldeman et al. | |
| 10,392,098 B2 | 8/2019 | Baldwin et al. | |
| 10,473,107 B1 * | 11/2019 | Newton | B64U 30/20 |
| 10,494,095 B2 | 12/2019 | Groninga et al. | |
| 11,167,845 B2 | 11/2021 | Schank | |
| 11,203,422 B2 * | 12/2021 | Buesing | B64C 27/33 |
| 11,267,569 B2 * | 3/2022 | Muren | G05D 1/08 |
| 2002/0109044 A1 * | 8/2002 | Rock | B64C 27/10 |
| | | | 244/17.23 |
| 2006/0231677 A1 * | 10/2006 | Zimet | B64C 27/10 |
| | | | 244/17.23 |
| 2012/0257974 A1 * | 10/2012 | Mok | F03D 7/0236 |
| | | | 416/201 A |
| 2012/0321472 A1 * | 12/2012 | Davis | A63H 27/12 |
| | | | 416/147 |
| 2014/0265077 A1 * | 9/2014 | Hinks | F16F 3/10 |
| | | | 267/151 |
| 2015/0003982 A1 * | 1/2015 | Radovich | F03D 7/06 |
| | | | 416/1 |
| 2016/0059960 A1 * | 3/2016 | Fearn | B64C 27/06 |
| | | | 244/17.11 |
| 2016/0236773 A1 * | 8/2016 | Jolly | B64C 27/001 |
| 2017/0283051 A1 * | 10/2017 | Radekopf | B29C 70/382 |
| 2018/0017040 A1 * | 1/2018 | Lee | F03D 1/06 |
| 2019/0002085 A1 * | 1/2019 | Choi | B64C 27/51 |
| 2019/0016441 A1 * | 1/2019 | Schank | B64C 27/30 |
| 2021/0114715 A1 * | 4/2021 | Cravener | B64C 11/325 |
| 2022/0119102 A1 * | 4/2022 | Shaanan | B64C 29/0033 |
| 2022/0153407 A1 * | 5/2022 | Howes | B64C 27/54 |

* cited by examiner

SYSTEMS AND DEVICES FOR PARKING A PROPULSOR TEETER

FIELD OF THE INVENTION

The present invention generally relates to the field of aircraft propulsors. In particular, the present invention is directed to systems and devices for parking a propulsor teeter.

BACKGROUND

Teetering mechanisms reduce strain on an aircraft while in edgewise flight, wherein the strain arises from unbalanced loads on, for example, a lift propulsor. Teetering of a propulsor may be unwanted during certain times of a flight.

SUMMARY OF THE DISCLOSURE

In an aspect of the present disclosure, a parking system for a propulsor teeter of an aircraft includes a hub, the hub mechanically connected to a rotor, wherein the hub is configured to rotate about a rotational axis; a teeter mechanism connected to the hub, wherein the teeter mechanism is configured to permit a propulsor plane of the propulsor to pivot with respect to a point of intersection between the propulsor plane and the rotational axis of the propulsor; and a locking mechanism configured to selectively lock the teeter mechanism while the aircraft is in flight, wherein selectively locking the teeter mechanism restricts the pivoting of the propulsor plane.

In another aspect of the present disclosure, a device for parking a propulsor teeter of an aircraft includes a locking mechanism configured to selectively lock a teeter mechanism while the aircraft is in flight, the teeter mechanism configured to permit a propulsor plane of a propulsor to pivot about a teeter axis with respect to a point of intersection between the propulsor plane and a rotational axis of the propulsor, wherein selectively locking the teeter mechanism restricts the pivoting of the propulsor plane, wherein the locking mechanism includes a teeter axis, an engaged state wherein the pivoting of the propulsor about the teeter axis is restricted, and a disengaged state wherein the pivoting of the propulsor about the teeter axis is unrestricted.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1A:
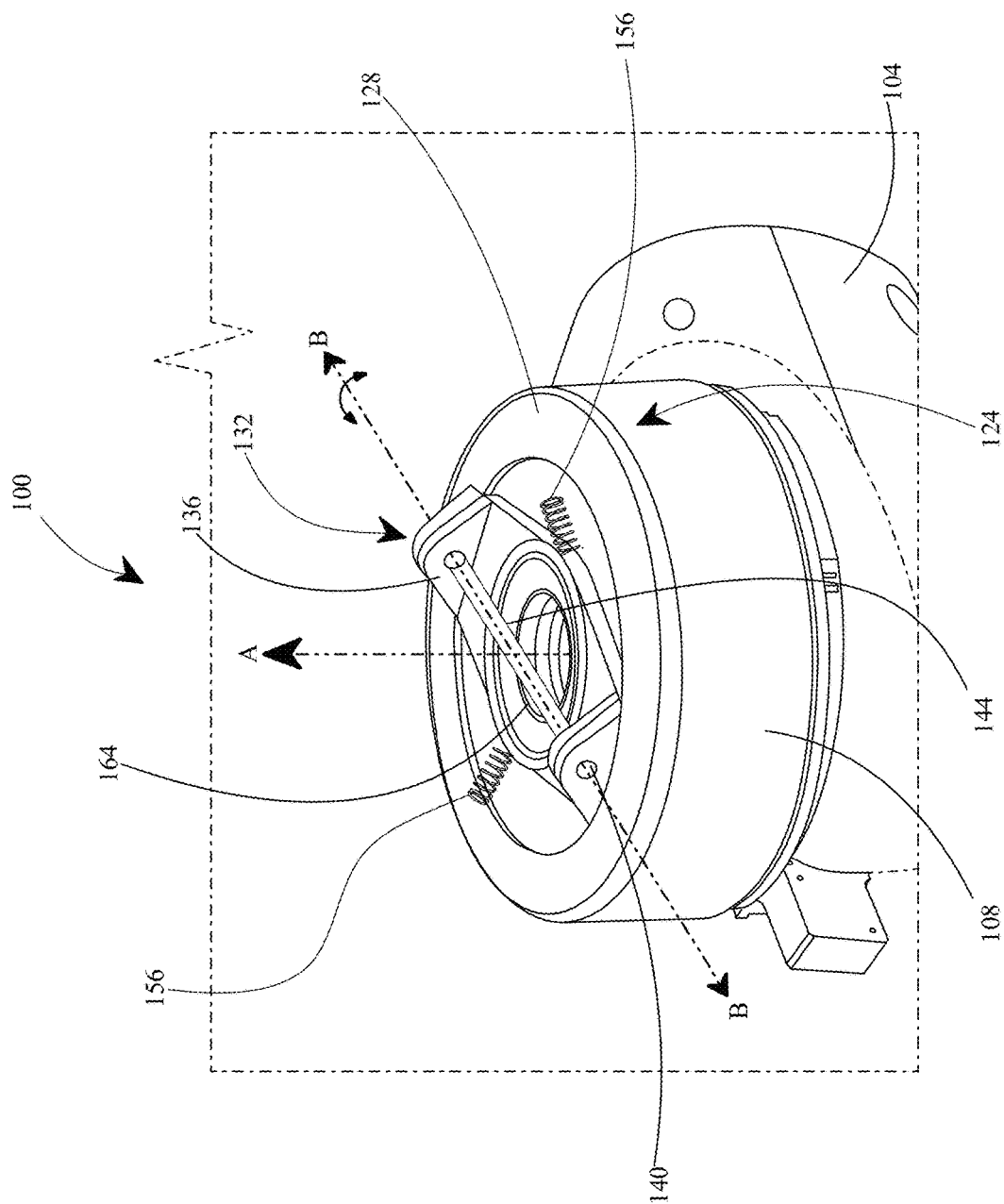
FIG. 1A is a schematic diagram illustrating an exemplary parking system for a propulsor teeter of an aircraft without a propulsor according to an embodiment of the disclosure.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and devices for parking a propulsor teeter. In an embodiment, the system includes a propulsor including a hub. The propulsor may be a lift propulsor on a vertical takeoff and landing (VTOL) aircraft. The hub is mechanically connected to a rotor, wherein the hub is configured to rotate about a rotational axis. A teeter mechanism is connected to the hub, wherein the teeter mechanism is configured to permit propulsor plane of the propulsor to pivot with respect to a point of intersection between the propulsor plane and the rotational axis of the propulsor. A locking mechanism is configured to selectively lock the teeter mechanism, wherein selectively locking the teeter mechanism restricts the pivoting of the propulsor plane. The locking mechanism may include an engaged state wherein the pivoting of the propulsor is restricted, and the locking mechanism may include a disengaged state wherein the pivoting of the propulsor is unrestricted. The locking mechanism may include one or more springs for instance on either side of a teeter axis, to prevent the propulsor from teetering. The springs may be actively controlled and connected to an actuator configured to extend or retract to affect the spring force on the propulsor. Alternatively or additionally, the springs may be statically controlled, for example through selection of spring rate and pre-loading (e.g., displacement). The locking mechanism may include electromagnets. In some embodiments, the locking mechanism may include a retractable collar. The locking mechanism may be controlled by a controller to engage and/or disengage the locking mechanism. The locking mechanism may be engaged and/or disengaged while an aircraft is in flight. For example, a pilot may engage the locking mechanism on an VTOL aircraft while performing a vertical takeoff and disengage the locking mechanism once the aircraft has transitioned to fixed-wing flight in which it will experience edgewise flight against the lift propulsor. Exemplary embodiments illustrating aspects of the present disclosure are described below in the context of several specific examples.

For purposes of description in this disclosure, the terms "up", "down", "forward", "horizontal", "left", "right", "above", "below", "beneath", and derivatives thereof shall relate to the invention as oriented in FIG. 3. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed in this disclosure are not to be considered as limiting, unless the claims expressly state otherwise.

Figure 1B:
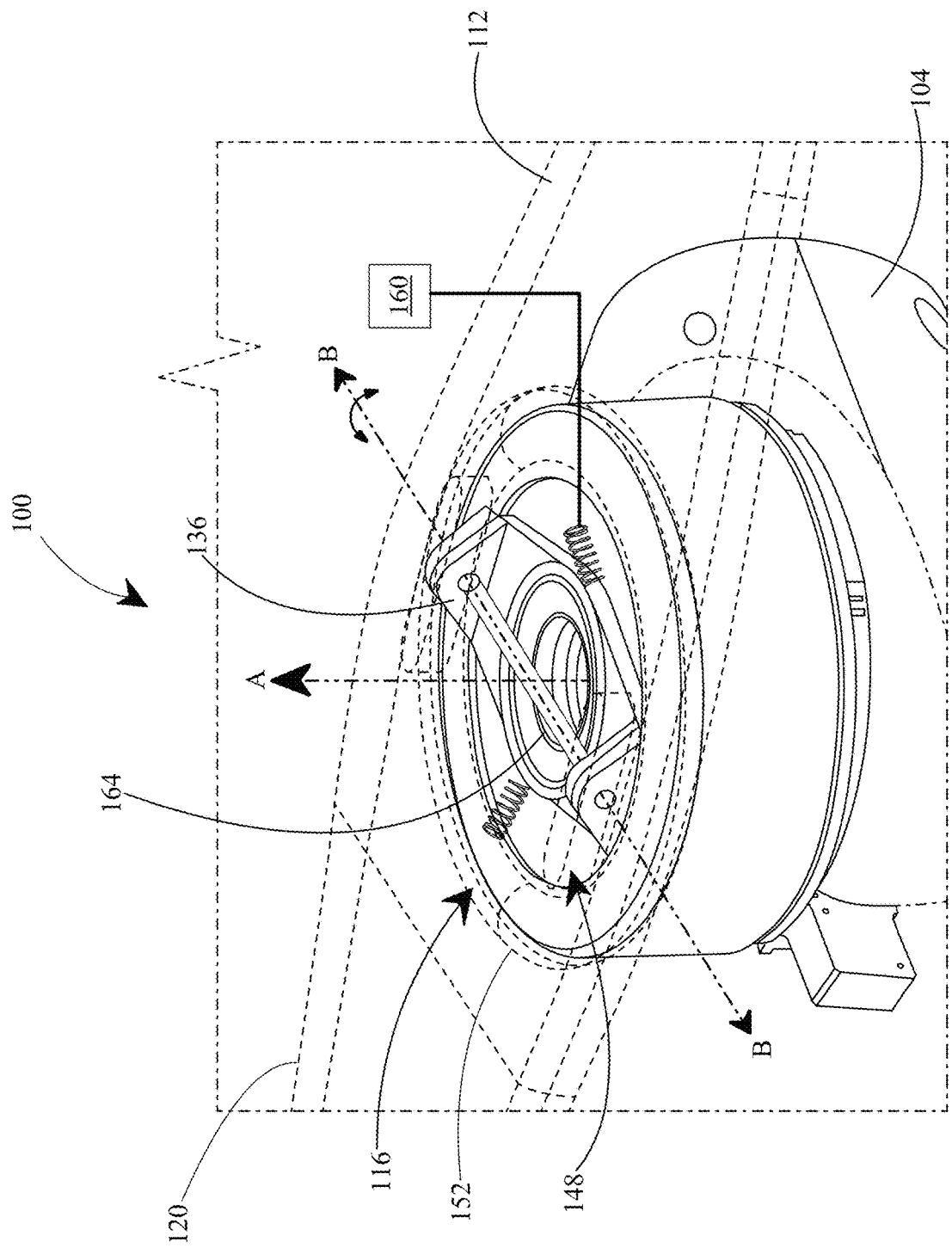
FIG. 1B is a schematic diagram illustrating an exemplary parking system for a propulsor teeter of an aircraft with a propulsor according to an embodiment of the disclosure.

Now referring to FIGS. 1A and 1B, a parking system for a propulsor teeter of an aircraft is illustrated. Aircraft 104 may include an electrical vertical takeoff and landing (eVTOL) aircraft, helicopter, unmanned aerial vehicles (UAVs), drones, rotorcraft, commercial aircraft, and/or the like. Aircraft 104 may include one or more components that generate lift, including without limitation wings, airfoils, rotors, propellers, jet engines, or the like, or any other component or feature that an aircraft may use for mobility during flight. Aircraft 104 may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generates lift and propulsion by way of one or more powered propulsors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight. Aircraft 104 may be the exemplary electric aircraft 300 shown in FIG. 3.

Aircraft 104 may be powered by a motor 108 including a motor rotor, which is also called "rotor" in this disclosure. Motor 108 may be configured to power propulsor 112. As used in this disclosure, "motor" is a device, such as an electric motor, that converts electrical energy into mechanical energy, for instance by causing a shaft to rotate. An electric motor may be driven by direct current (DC) electric power. As an example and without limitation, an electric motor may include a brushed DC electric motor or the like. An electric motor may be, without limitation, driven by electric power having varying or reversing voltage levels, such as alternating current (AC) power as produced by an alternating current generator and/or inverter, or otherwise varying power, such as produced by a switching power source. An electric motor may include, for example and without limitation, brushless DC electric motors, permanent magnet synchronous an electric motor, switched reluctance motors, or induction motors. In addition to inverter and/or a switching power source, a circuit driving an electric motor may include electronic speed controllers (not shown) or other components for regulating motor speed, rotation direction, and/or dynamic braking. Motor 108 may be used in an electric vehicle such as an electric automobile and an electric aircraft, including an electrical vertical takeoff and landing (eVTOL) aircraft, a helicopter, a commercial aircraft, an unmanned aerial vehicle, a rotorcraft, and the like. Motor 108 may include the exemplary embodiment of motor 200 discussed in reference to FIG. 2. Motor 108 may be consistent with disclosure of motor in U.S. patent application Ser. No. 17/563,498 filed on Dec. 28, 2021, and titled "ELECTRIC AIRCRAFT LIFT MOTOR WITH AIR COOLING", which is incorporated by reference herein in its entirety.

With continued reference to FIGS. 1A and 1B, system 100 includes a propulsor 112 including a hub 116 mechanically connected, directly or indirectly (e.g., through a drivetrain), to motor 108, wherein the hub 116 is configured to rotate about a rotational axis A. Hub 116 may be mechanically connected to rotor of motor 108 by at least a gear, such as a gearbox, wherein rotation of rotor causes rotation of the hub 116. Depending on at least a gear, one rotation of rotor may cause less than one rotation, one rotation, or more than one rotation of hub 116. In some embodiments, motor 108 may be a direct drive motor, which is for example connected to propellor with a driveshaft, wherein one rotation of rotor also causes one rotation of hub 116. Motor 108 may power a propulsor 112. Propulsor 112 and hub 116 may be monolithic. Propulsor 112 may include two blades 120 extending from hub 116 in opposite directions. A "propulsor," as used herein, is a component or device used to propel a craft by exerting force on a fluid medium, which may include a gaseous medium such as air or a liquid medium such as water. Propulsor 112 may be any device or component that propels an aircraft or other vehicle while on ground and/or in flight. Propulsor 112 may include one or more propulsive devices. Propulsor 112 may include a lift propulsor configured to create lift for aircraft 104. As used in this disclosure, "lift" is a force exerted on an aircraft that directly opposes the weight of the aircraft. In an embodiment, propulsor 112 may include a thrust element which may be integrated into the propulsor 112. As used in this disclosure, a "thrust element" is any device or component that converts mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, propulsor 112 may include a pusher propeller. Pusher propeller may be mounted behind the engine to ensure the drive shaft is in compression. Pusher propeller may include a plurality of blades, for example, two, three, four, five, six, seven, eight, or any other number of blades. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like. In an embodiment, propulsor 112 may include at least a blade 120. Persons skilled in the art, upon reviewing the entirety of this disclosure, will be aware of various devices that may be used as propulsor 112. In an embodiment, when a propulsor twists and pulls air behind it, it will, at the same time, push the aircraft with an equal amount of force. The more air pulled behind the aircraft, the more the aircraft is pushed forward. In an embodiment, thrust element may include a helicopter rotor incorporated into propulsor 112. A "helicopter rotor," as used herein, may include one or more blade 120 or wing elements driven in a rotary motion to drive fluid medium in a direction axial to the rotation of the blade 120 or wing element. Its rotation is due to the interaction between the windings and magnetic fields which produces a torque around the rotor's axis. A helicopter rotor may include a plurality of blade 120 or wing elements. Propulsor 112 may be substantially rigid and not susceptible to bending during flight. Therefore, in some embodiments, the blades of propulsor 112 may be rigid such that they are unable to feather. As used in this disclosure, a propulsor blade "feathers" when it changes its pitch. For example, for a blade that is configured to feather, forces exerted by a fluid on a moving vehicle when a propulsor is not rotating may cause the blade to adjust its pitch so the blade is parallel to the oncoming fluid.

With continued reference to FIGS. 1A and 1B, propulsor 112 may be a lift propulsor oriented such that propulsor plane is parallel with a ground when aircraft 104 is landed. As used in this disclosure, a "propulsor plane" is a plane in which one or more propulsors rotate. Propulsor plane may generally be orthogonal to an axis of rotation, such as rotational axis A. For example, with no teetering, propulsor plane may be orthogonal to rotational axis A. When there is a substantial moment exerted on propulsor 112 about a point coincident to rotational axis A (for example resulting from air resistance during edgewise flight) the force may cause significant stress and strain against propulsor 112 and/or hub 116. As used in this disclosure, "edgewise flight" is a flight orientation wherein an air stream is at least partially directed at an edge of a lift propulsor. Edgewise flight (exaggerated for explanation) may occur when an aircraft is traveling in a direction orthogonal to a rotational axis of a lift propulsor and/or parallel to a propulsor plane of the lift propulsor, causing an air stream to be directed at an edge of the lift propulsor. Edgewise flight may also occur when an aircraft is traveling in a direction in which a component of the velocity of the aircraft is in a direction orthogonal to a rotational axis of a lift propulsor and/or parallel to a propulsor plane of the lift propulsor. Additional forces, in addition to the air resistance, may also create significant stress and strain on propulsor 112 and/or hub 116. As a non-limiting example, as aircraft 104 travels in edgewise flight, propulsor 112 may rotate such that an advancing blade of the propulsor 112 is rotating forward and into incoming air, while a receding blade of the propulsor 112 is rotating backward and away from incoming air. As used in this disclosure, an "advancing blade" is a blade of a lift propulsor that is instantaneously moving substantially in the same direction as the aircraft's forward motion. As used in this disclosure, a "receding blade" is a blade of a lift propulsor that is instantaneously moving substantially in an opposite direction to the aircraft's forward motion. Because blades of propulsor 112 have airfoil cross sections, advancing blade produces greater lift than receding blade due to the relative motion of each of the blades relative to the oncoming air. This may cause a moment, for example about a point coincident with axis A, due to the imbalanced lift forces created by the advancing blade and the receding blade. In some cases, this moment creates wear on one or more of propulsor assembly or motor assembly, such as bearings. Edgewise flight may cause issues with aircraft 104. For example, edgewise flight may cause excessive flapping of blades 120 during flight including flapping angulation. Additionally, in cases involving a direct drive motor, moments resulting from edgewise flight may result in displacement of rotor within motor, potentially crashes the assembly.

Still referring to FIGS. 1A and 1B, system 100 includes a teeter mechanism 124 connected to hub 116, wherein teeter mechanism 124 is configured to permit a propulsor plane of propulsor 112 to pivot. In some cases, pivoting occurs with respect to a point of intersection between the propulsor plane and rotational axis of the propulsor 112. As used in this disclosure, a "teeter mechanism" is a mechanism that provides a pivot by which a propulsor may teeter. Teeter mechanism 124 may reduce the issues discussed above caused by edgewise flight. As a non-limiting example, teeter mechanism 124 may provide a freedom of motion for advancing blade of propulsor 112 to lift and thus reduce strain caused by the imbalance of forces at the advancing blade and receding blade. Said another way, in some cases, centrifugal forces and inertia acting on the rotating propulsor will tend to counter moments induced by edgewise flight; requiring less load to be carried by mechanical elements, such as bearings. Teeter mechanism 124 may be attached to hub 116 and motor 108. Teeter mechanism 124 may include a base 128 attached to motor 108 to rotate in tandem with the rotor. Base 128 may be attached to a rotor shaft 164 of motor 108. Teeter mechanism 124 may include a pivot point 132 at which propulsor 112 may teeter along a teeter axis B perpendicular to a pair of monolithic blades 120 extending from hub 116, allowing propulsor plane to shift to an orientation that is non-orthogonal to rotational axis A. Pivot point 132 may include at least a hinge 136 attached to base 128 on which propulsor 112 may teeter. As used in this disclosure, a "hinge" is a joint attached to at least an object about which the object may rotate. In some embodiments, hinge 136 may include two hinges, one hinge on either side of axis of rotation A. In some embodiments, the two hinges 136 may define teeter axis B. Hinge 136 may be a triangular shape, similar to an isosceles with equal length opposing sides and equal angels at base 128. In some embodiments, hinge 136 may have a curved corner extending from base 128 and may form a fulcrum on which propulsor 112 may teeter. Hinge 136 may include an aperture 140 through which an axel 144 may run parallel to teeter axis B. Axel 144 may run through aperture 140 in both hinges 136 and connect to hub 116. Axel 144 may be rotatably attached to hub 116 by an adhesive, welding, screws, and/or the like. In some embodiments, axel 144 may be free to rotate in aperture 140. In some embodiments, axel 144 may include two separate axels parallel to teeter axis B wherein a first axel 144 may run through aperture 140 in a first hinge 136 and attach to hub 116 on either side of the first hinge 136 and a second axel 144 may run through a second hinge 136 and attach to the hub 116 on either side of the second hinge 136. Hub 116 may include a recess 148. Recess 148 may be a cavity in hub 116 facing base 128. Recess 148 may partially receive hinge 136 such that a portion of the hinge 136, such as curved corner, is positioned within the recess 148. Recess 148 may contact curved corner. Recess 148 may include a plurality of recesses, such as a recess 148 for each hinge 136. In some embodiments, curved corner of hinge 136 may form a fulcrum against recess 148. In some embodiments, hinge 136 may be spaced from recess 148. Hub 116 may include a track 152 recessed in the hub 116 facing motor 108. Track 152 may provide additional space between hub 116 and motor 108 for the hub 116 and/or propulsor 112 to teeter with less impediment, and thus a greater potential angular displacement. A shape of track 152 may correspond with a shape of base 128. Teeter mechanism 124 may include a centering spring configured to recenter propulsor plane to a position orthogonal to rotational axis A. In some embodiments, centering spring may have a spring constant large enough to prevent propulsor 112 from teetering about teeter axis B when the propulsor 112 rotates at a rate of approximately ten hertz or less. Centering spring may include a plurality of springs, wherein at least a first centering spring is on a first side of teeter axis B and at least a second centering spring is on a second side of teeter axis B. Centering spring may be attached on a first end to a component that is stationary relative to teeter mechanism 124, such as rotor, base 128, and/or axel 144 and attached on a second opposite end to a moveable component such as hub 116 and/or propulsor 112.

With continued reference to FIGS. 1A and 1B, system 100 includes a locking mechanism 156 connected to hub 116 and configured to selectively lock teeter mechanism 124 while aircraft 104 is in flight, thereby preventing hub 116 and/or propulsor 112 from teetering on teeter mechanism 124. As used in this disclosure, a teeter mechanism is "selectively locked" when a propulsor plane is restricted from pivoting on the teeter mechanism. In some embodiments, propulsor plane may be restricted from pivoting in a range of rotational speeds of propulsor 112. For example, locking mechanism 156 may selectively lock teeter mechanism 124 such that propulsor 112 cannot teeter until it reaches a threshold rotational speed. Locking mechanism 156 may include an engaged state wherein the pivoting of propulsor 112 is restricted, and the locking mechanism 156 may include a disengaged state wherein the pivoting of the propulsor 112 is unrestricted. When locking mechanism 156 is engaged, propulsor plane is fixed at an orientation orthogonal to rotational axis A. A rotational speed of propulsor 112 may affect whether the locking mechanism is in engaged state. Locking mechanism 156 may be configured to engage and/or disengage during flight of aircraft 104. For example, locking mechanism 156 may be disengaged when aircraft 104 is performing a vertical takeoff and/or a vertical landing and engaged when the aircraft 104 is in fixed-wing flight. Locking mechanism 156 may be engaged and/or disengaged by a signal from a computing device, e.g., flight controller illustrated in FIG. 6, controller 160 discussed below, and the like. In some embodiments, locking mechanism 156 may be engaged and/or disengaged by a pilot, for instance, as a non-limiting example, by manipulating a pilot control. Locking mechanism 156 may include an engaged state configured to lock teeter mechanism 124 and a disengaged state configured to unlock the teeter mechanism 124. In some embodiments, locking mechanism 156 may include at least a spring attached to hub 116 and/or propulsor 112 at a first end of the springs and teeter mechanism 124 and/or a teeter mechanism and/or motor 108 at an opposite second end of the springs. As a non-limiting example, springs may be attached to an element of propulsor 112, such as track 152, at first end and attached to axel 144 at second end. Springs may be attached to propulsor 112 at first end and base 128 at second end. In some embodiments, locking mechanism 156 includes a spring on either side of teeter axis B. Locking may include a plurality of springs on either side of teeter axis B. Springs may have a spring constant and/or preload (i.e., initial displacement) large enough to prevent teetering of propulsor 112 when the propulsor 112 rotates ten or fewer revolutions per minute. Springs may have a spring constant that provides a large enough force to prevent centrifugal forces caused by a rotation of propulsor 112, below a threshold rotational speed, when aircraft 104 is in flight from teetering on teeter mechanism 124. In some embodiments, springs may have a spring constant that provides a large enough force to prevent propulsor 112 from teetering on teeter mechanism 124 despite forces caused when aircraft is engaged in conventional fixed wing flight. In some embodiments, locking mechanism 156 may comprise a centering spring wherein the centering spring may have a spring constant selected to prevent propulsor 112 from teetering about teeter axis B when the propulsor 112 is substantially parked and allow teetering when the propulsor 112 is rotating, such as without limitation at a high frequency greater than ten hertz. In some embodiments, a side of spring may be attached to an actuator configured to extend and retract from any component of aircraft 104 discussed above that spring may be connected to, such as axel 144, motor 108, and/or base 128. As used in this disclosure, an "actuator" is a device that actuates and causes a machine or other device to move. The actuator may be a linear actuator, hydraulic actuator, electric actuator, thermal and magnetic actuator, mechanical actuator, and the like. Actuator may be controlled by a controller 160, as discussed below and illustrated in FIG. 5. For example, in some embodiments, actuator may be configured to respond to control signals from controller 160. In some cases, actuator may be actuated in response to activation, electrification, and/or control of the motor 108 (e.g., drive current of the motor 108). In some cases, actuator may be configured to retract and essentially stiffen spring, which may engage locking mechanism 156. Actuator may be configured to extend to essentially loosen spring, which may disengage the locking mechanism 156. Controller 160 and/or motor 108 may adjust a position of actuator and alter a maximum rotational speed of propulsor 112 in which locking mechanism 156 is engaged, preventing the propulsor 112 from teetering about teeter axis B.

Still referring to FIGS. 1A and 1B, locking mechanism 156 may include a magnetic lock controlled by an applied current. Magnetic lock may include a first magnetic component and a second magnetic component, where second magnetic component is fixedly attached to motor 108 and/or base 128. For the purposes of this disclosure, a "magnetic component" is an element having magnetic properties. In some embodiments first magnetic component may be attached to hub 116 and/or propulsor 112. Magnetic components may be mounted to various opposing surfaces that allow magnetic components to face each other. When magnetic lock is engaged, such as when a current is applied to first magnetic component and/or second magnetic component, the magnetic lock prevents propulsor 112 from teetering about teeter axis B. In one or more embodiments, magnetic components may be various materials with magnetic properties, such as an electromagnetism, ferromagnetism, paramagnetism, or any other magnetism that allows magnetic components to form a magnetic field that result in magnetic attraction between magnetic components to each other. For example, and without limitation, first magnetic component may include an electromagnet, and second magnetic component may include a permanent magnet. In another example, and without limitation, first magnetic component may include an electromagnet, and second magnetic component may include a ferromagnetic metal. A ferromagnetic metal may include nickel, iron, cobalt, corresponding alloys, and the like. A ferromagnetic material may be a permanent magnet, an electrically-induced magnet, or a material affect by a magnetic field. In one or more embodiments, magnetic components may be various shapes and sizes. For instance, magnetic components may be any shape or size that allows magnetic components to be mounted to a desired surface while still maintaining a magnetic field strength strong enough to stop teetering of propulsor 112. In one or more embodiments, either magnetic component may be an electromagnet so that the magnetic field may be turned on and off as needed. The electromagnet allows for an electrically-induced magnetic field to be develop and thus create an attractive force between magnetic component that cause magnetic components to lock teeter mechanism 124. Electromagnet may be controlled by a controller 160, as discussed below. Electromagnet may be controlled in response to current from motor, 112. For example, in some embodiments, motor current may disengage the electromagnet and locking mechanism.

Figure 8:
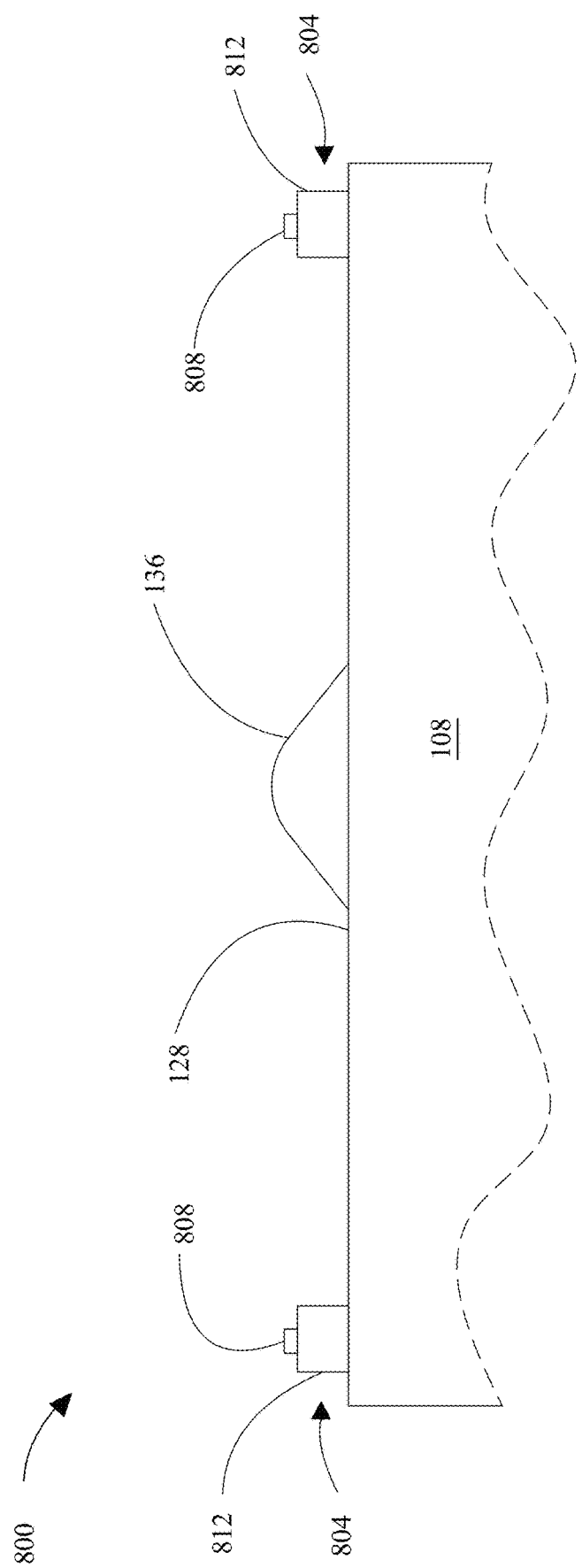
FIG. 8 is an illustration of a parking system including a solenoid.

With continued reference to FIGS. 1A and 1B, locking mechanism 156 may include a solenoid, as shown in FIG. 8, configured to arrest and/or allow teetering of propulsor 112 when energized. As used in this disclosure, a "solenoid" is an electromagnetic actuator including a coil of wire and a magnet. In some cases, a solenoid may include a static coil and a slidable ferromagnetic plunger, also known as an armature, in the coil. The plunger may partially extend from the coil when current is not applied to solenoid. When sufficient current is applied to solenoid, the electromagnetic force generated by the coil may pull the plunger into the coil. Solenoid may be biased using one or more compliant elements (e.g., springs). For example, solenoid may be normally open or normally closed. Solenoid may be configured such that it engages locking mechanism 156 to prevent movement of propulsor 112 when the plunger extends from the coil. Solenoid may be energized by current from motor in parallel or series with the motor, such that energizing the motor engages solenoid and disengages locking mechanism 156. System 100 may include a switch to control current applied to solenoid. Locking mechanism 156 may be consistent with disclosure of magnetic lock in U.S. patent application Ser. No. 17/732,791 filed on Apr. 29, 2022 and titled "MAGNETIC LOCKING SYSTEM OF AN ELECTRIC AIRCRAFT ROTOR AND METHODS THEREOF", which is incorporated by reference herein in its entirety.

Figure 7:
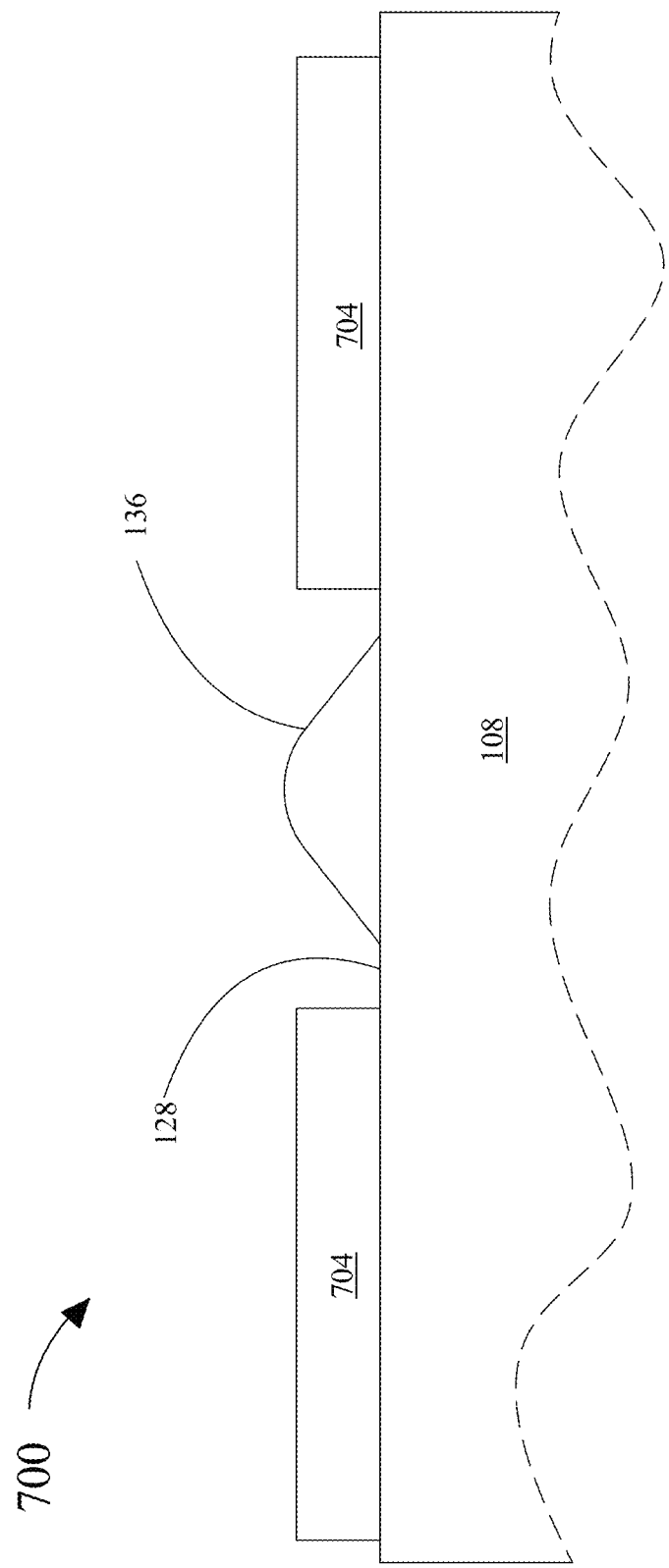
FIG. 7 is an illustration of a parking system including a retractable collar.

Locking mechanism 156 may include a retractable collar, as shown in FIG. 7, configured to extend between hub 116 and motor 108 and/or teeter mechanism 124. Retractable collar may extend from base 128 to track 152, preventing propulsor 112 from teetering on teeter mechanism 124. Retractable collar may be positioned about a circumference of base 128. In some embodiments, retractable collar may include a continuous collar that extends to both sides of teeter axis B. In some embodiments, retractable collar may include individual extenders that extend from base 128 to hub 116, wherein at least a first extender is on a first side of teeter axis B and at least a second extender is on a second side of teeter axis B. An actuator may be attached to retractable collar and configured to extend and retract the retractable collar. In some embodiments, actuator may include a solenoid as discussed above.

Still referring to FIGS. 1A and 1B, system 100 may include a computing device communicatively connected to locking mechanism 156. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Controller 160 may be configured to engage and/or disengage locking mechanism 156. For example, controller 160 may disengage locking mechanism 156 to lock teeter mechanism 124 when aircraft 104 performs a vertical takeoff and engage the locking mechanism 156, thereby unlocking the teeter mechanism 124, when the aircraft 104 transitions to fixed-wing flight. Controller 160 may control retractable collar, magnetic lock, actuator attached to spring, and/or any other components of locking mechanism 156 described in this disclosure.

Controller 160 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 160 may include a single computing device operating independently, or may include two or more computing device operating in concert, in parallel, sequentially or the like; two or more computing devices may be included together in a single computing device or in two or more computing devices. Controller 160 may interface or communicate with one or more additional devices as described below in further detail via a network interface device. Network interface device may be utilized for connecting controller 160 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 160 may include but is not limited to, for example, a computing device or cluster of computing devices in a first location and a second computing device or cluster of computing devices in a second location. Controller 160 may include one or more computing devices dedicated to data storage, security, distribution of traffic for load balancing, and the like. Controller 160 may distribute one or more computing tasks as described below across a plurality of computing devices of computing device, which may operate in parallel, in series, redundantly, or in any other manner used for distribution of tasks or memory between computing devices. Controller 160 may be implemented using a "shared nothing" architecture in which data is cached at the worker, in an embodiment, this may enable scalability of system 100 and/or computing device.

With continued reference to FIGS. 1A and 1B, controller 160 may be designed and/or configured to perform any method, method step, or sequence of method steps in any embodiment described in this disclosure, in any order and with any degree of repetition. For instance, controller 160 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 160 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 2:
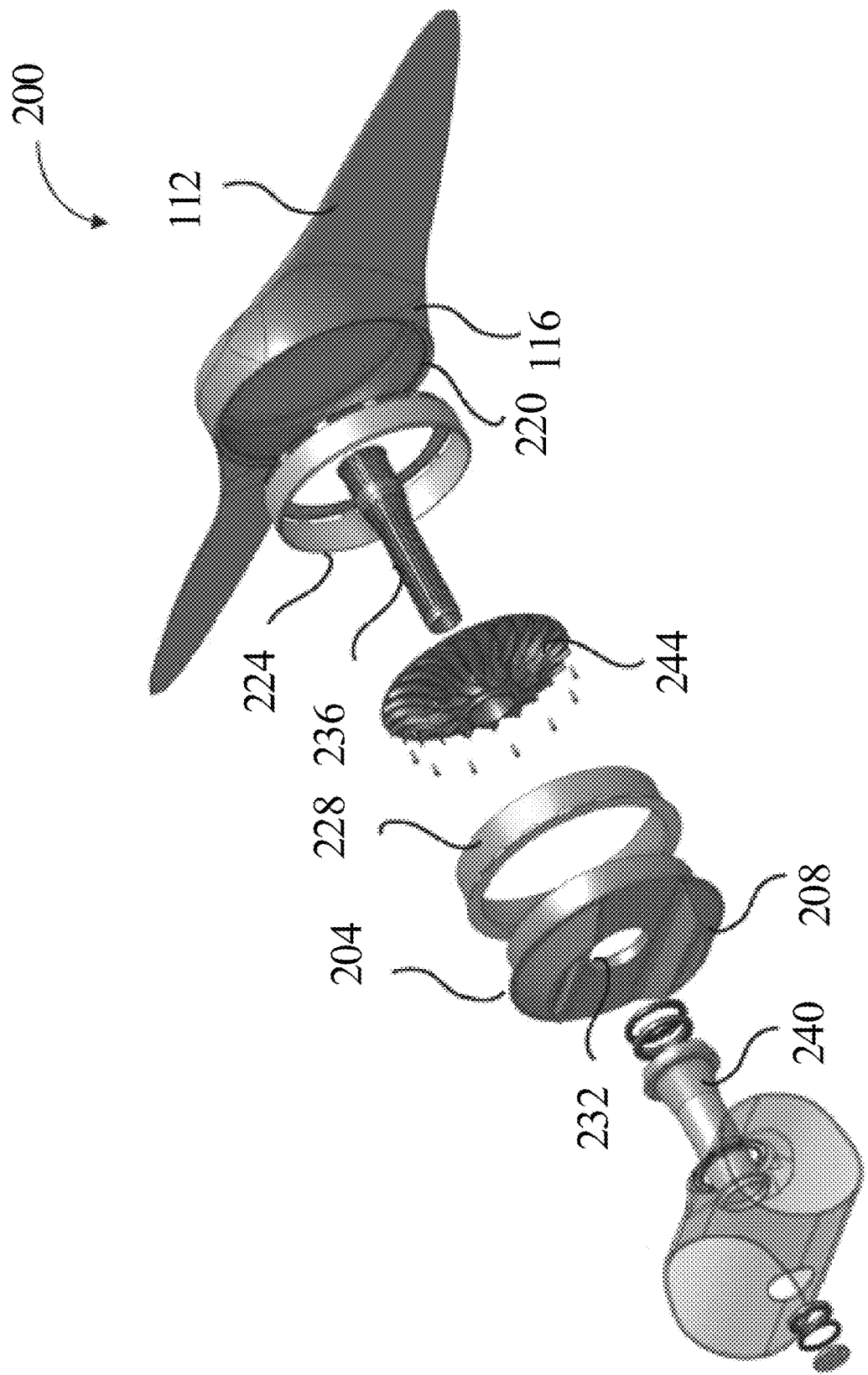
FIG. 2 is an exploded view of an exemplary motor according to an embodiment of the disclosure.

Referring now to FIG. 2, an exemplary embodiment of a motor 200 is illustrated. Motor 200 may include at least a stator 204. "Stator," as used herein, is a stationary component of a motor and/or motor assembly. In an embodiment, stator 204 may include at least first magnetic element 208. As used herein, first magnetic element 208 is an element that generates a magnetic field. For example, first magnetic element 208 may include one or more magnets which may be assembled in rows along a structural casing component. Further, first magnetic element 208 may include one or more magnets having magnetic poles oriented in at least a first direction. The magnets may include at least a permanent magnet. Permanent magnets may be composed of, but are not limited to, ceramic, alnico, samarium cobalt, neodymium iron boron materials, any rare earth magnets, and the like. Further, the magnets may include an electromagnet. As used herein, an electromagnet is an electrical component that generates magnetic field via induction; the electromagnet may include a coil of electrically conducting material, through which an electric current flow to generate the magnetic field, also called a field coil of field winding. A coil may be wound around a magnetic core, which may include without limitation an iron core or other magnetic material. The core may include a plurality of steel rings insulated from one another and then laminated together; the steel rings may include slots in which the conducting wire will wrap around to form a coil. First magnetic element 208 may act to produce or generate a magnetic field to cause other magnetic elements to rotate, as described in further detail below. Stator 204 may include a frame to house components including first magnetic element 208, as well as one or more other elements or components as described in further detail below. In an embodiment, a magnetic field may be generated by first magnetic element 208 and can include a variable magnetic field. In embodiments, a variable magnetic field may be achieved by use of an inverter, a controller, or the like. In an embodiment, stator 204 may have an inner and outer cylindrical surface; a plurality of magnetic poles may extend outward from the outer cylindrical surface of the stator. In an embodiment, stator 204 may include an annular stator, wherein the stator is ring-shaped. In an embodiment, stator 204 is incorporated into a DC motor where stator 204 is fixed and functions to supply the magnetic fields where a corresponding rotor, as described in further detail below, rotates. In an embodiment, stator 204 may be incorporated an AC motor where stator 204 is fixed and functions to supply the magnetic fields by radio frequency electric currents through an electromagnet to a corresponding rotor, as described in further detail below, rotates.

Still referring to FIG. 2, motor 200 may include propulsor 112. In embodiments, propulsor 112 may include an integrated rotor. As used herein, a rotor is a portion of an electric motor that rotates with respect to a stator of the electric motor, such as stator 204. A propulsor, as used herein, is a component or device used to propel a craft by exerting force on a fluid medium, which may include a gaseous medium such as air or a liquid medium such as water. Propulsor 112 may be any device or component that consumes electrical power on demand to propel an aircraft or other vehicle while on ground and/or in flight. Propulsor 112 may include one or more propulsive devices. In an embodiment, propulsor 112 may include a thrust element which may be integrated into the propulsor. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, at least a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like. In an embodiment, propulsor 112 may include at least a blade. Persons skilled in the art, upon reviewing the entirety of this disclosure, will be aware of various devices that may be used as propulsor 112. In an embodiment, when a propulsor twists and pulls air behind it, it will, at the same time, push the aircraft forward with an equal amount of force. The more air pulled behind the aircraft, the more the aircraft is pushed forward. In an embodiment, thrust element may include a helicopter rotor incorporated into propulsor 112. A helicopter rotor, as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. A helicopter rotor may include a plurality of blade or wing elements.

Continuing to refer to FIG. 2, in an embodiment, propulsor 112 may include hub 116 rotatably mounted to stator 204. Rotatably mounted, as described herein, is functionally secured in a manner to allow rotation. Hub 116 is a structure which allows for the mechanically coupling of components of the integrated rotor assembly. In an embodiment, hub 116 can be mechanically coupled to propellers or blades. In an embodiment, hub 116 may be cylindrical in shape such that it may be mechanically joined to other components of the rotor assembly. Hub 116 may be constructed of any suitable material or combination of materials, including without limitation metal such as aluminum, titanium, steel, or the like, polymer materials or composites, fiberglass, carbon fiber, wood, or any other suitable material. Hub 116 may move in a rotational manner driven by interaction between stator and components in the rotor assembly. Persons skilled in the art, upon reviewing the entirety of this disclosure, will be aware of various structures that may be used as or included as hub 116, as used and described herein.

Still referring to FIG. 2, in an embodiment, propulsor 112 and/or rotor shaft 236 may include second magnetic element 220, which may include one or more further magnetic elements. Second magnetic element 220 generates a magnetic field designed to interact with first magnetic element 208. Second magnetic element 220 may be designed with a material such that the magnetic poles of at least a second magnetic element are oriented in an opposite direction from first magnetic element 208. In an embodiment, second magnetic element 220 may be affixed to hub 116, rotor shaft 236, or another rotating or stationary electric motor component disclosed herein. Affixed, as described herein, is the attachment, fastening, connection, and the like, of one component to another component. For example, and without limitation, affixed may include bonding the second magnetic element 220 to hub 116, such as through hardware assembly, spot welding, riveting, brazing, soldering, glue, and the like. Second magnetic element 220 may include any magnetic element suitable for use as first magnetic element 208. For instance, and without limitation, second magnetic element may include a permanent magnet and/or an electromagnet. Second magnetic element 220 may include magnetic poles oriented in a second direction opposite, in whole or in part, of the orientation of the poles of first magnetic element 208. In an embodiment, motor 200 may include a motor assembly incorporating stator 204 with a first magnet element and second magnetic element 220. First magnetic element 208 may include magnetic poles oriented in a first direction, a second magnetic element includes a plurality of magnetic poles oriented in the opposite direction than the plurality of magnetic poles in the first magnetic element 208.

Referring again to FIG. 2, in an embodiment, first magnetic element 208 may be a productive element, defined herein as an element that produces a varying magnetic field. Productive elements may produce magnetic field that may attract and other magnetic elements, possibly including a receptive element. Second magnetic element may be a productive or receptive element. A receptive element may react due to the magnetic field of first magnetic element 208. In an embodiment, first magnetic element 208 may produce a magnetic field according to magnetic poles of first magnetic element 208 oriented in a first direction. Second magnetic element 220 may produce a magnetic field with magnetic poles in the opposite direction of the first magnetic field, which may cause the two magnetic elements to attract one another. Receptive magnetic element may be slightly larger in diameter than the productive element. Interaction of productive and receptive magnetic elements may produce torque and cause the assembly to rotate. Hub 116 and rotor assembly may both be cylindrical in shape where rotor may have a slightly smaller circumference than hub 116 to allow the joining of both structures. Coupling of hub 116 to stator 204 may be accomplished via a surface modification of either hub 116, stator 204 or both to form a locking mechanism. Coupling may be accomplished using additional nuts, bolts, and/or other fastening apparatuses. In an embodiment, an integrated rotor assembly as described above may reduce profile drag in forward flight for an electric aircraft. Profile drag may be caused by a number of external forces that the aircraft is subjected to. In an embodiment, incorporating propulsor 112 into hub 116, may reduce a profile of motor 200 resulting in a reduced profile drag. In an embodiment, the rotor, which may include motor inner magnet carrier 224, motor outer magnet carrier 228, propulsor 112 may be incorporated into hub 116. In an embodiment, inner motor magnet carrier 224 may rotate in response to a magnetic field. The rotation may cause hub 116 to rotate. This unit may be inserted into motor 200 as one unit. This may enable ease of installation, maintenance, and removal.

Still referring to FIG. 2, stator 204 may include through-hole 232. Through-hole 232 may provide an opening for a component to be inserted through to aid in attaching propulsor with integrated rotor and rotor shaft to stator. In an embodiment, through-hole 232 may have a round or cylindrical shape and be located at a rotational axis of stator 204, which in an embodiment may be similar to or the same as axis of rotation 212. Hub 116 may be mounted to stator 204 by means of rotor shaft 236 rotatably inserted though through-hole 232. The rotor shaft 236 may be mechanically coupled to stator 204 such that rotor shaft 236 is free to rotate about its centerline axis, which may be effectively parallel and coincident to stator's centerline axis, and further the rotor shaft and stator may include a void of empty space between them, where at least a portion the outer cylindrical surface of the rotor shaft is not physically contacting at least a portion of the inner cylindrical surface of the stator. This void may be filled, in whole or in part, by air, a vacuum, a partial vacuum or other gas or combination of gaseous elements and/or compounds, to name a few. Through-hole 232 may have a diameter that is slightly larger than a diameter of rotor shaft 236 to allow rotor shaft 236 to fit through through-hole 232 to connect stator 204 to hub 116. Rotor shaft 236 may rotate in response to rotation of propulsor 112.

Still referring to FIG. 2, motor 200 may include a bearing cartridge 240. Bearing cartridge 240 may include a bore. Rotor shaft 236 may be inserted through the bore of bearing cartridge 240. Bearing cartridge 240 may be attached to a structural element of a vehicle. Bearing cartridge 240 functions to support the rotor and to transfer the loads from the motor. Loads may include, without limitation, weight, power, magnetic pull, pitch errors, out of balance situations, and the like. Bearing cartridge 240 may include a bore. Bearing cartridge 240 may include a smooth metal ball or roller that rolls against a smooth inner and outer metal surface. The rollers or balls take the load, allowing the device to spin. a bearing may include, without limitation, a ball bearing, a straight roller bearing, a tapered roller bearing or the like. Bearing cartridge 240 may be subject to a load which may include, without limitation, a radial or a thrust load. Depending on the location of bearing cartridge 240 in the assembly, it may see all of a radial or thrust load or a combination of both. In an embodiment, bearing cartridge 240 may join motor 200 to a structure feature. Bearing cartridge 240 may function to minimize the structural impact from the transfer of bearing loads during flight and/or to increase energy efficiency and power of propulsor. Bearing cartridge 240 may include a shaft and collar arrangement, wherein a shaft affixed into a collar assembly. A bearing element may support the two joined structures by reducing transmission of vibration from such bearings. Roller (rolling-contact) bearings are conventionally used for locating and supporting machine parts such as rotors or rotating shafts. Typically, the rolling elements of a roller bearing are balls or rollers. In general, a roller bearing is a is type of anti-friction bearing; a roller bearing functions to reduce friction allowing free rotation. Also, a roller bearing may act to transfer loads between rotating and stationary members. In an embodiment, bearing cartridge 240 may act to keep propulsor 112 and components intact during flight by allowing motor 200 to rotate freely while resisting loads such as an axial force. In an embodiment, bearing cartridge 240 may include a roller bearing incorporated into the bore. a roller bearing is in contact with rotor shaft 236. Stator 204 may be mechanically coupled to inverter housing. Mechanically coupled may include a mechanical fastening, without limitation, such as nuts, bolts or other fastening device. Mechanically coupled may include welding or casting or the like. Inverter housing may contain a bore which allows insertion by rotor shaft 236 into bearing cartridge 240.

Still referring to FIG. 2, motor 200 may include a motor assembly incorporating a rotating assembly and a stationary assembly. Hub 116, motor inner magnet carrier 224 and rotor shaft 236 may be incorporated into the rotor assembly of motor 200 which make up rotating parts of electric motor, moving between the stator poles and transmitting the motor power. As one integrated part, the rotor assembly may be inserted and removed in one piece. Stator 204 may be incorporated into the stationary part of the motor assembly. Stator and rotor may combine to form an electric motor. In embodiment, an electric motor may, for instance, incorporate coils of wire, which may be similar to or the same as any of the electrically conductive components in the entirety of this disclosure, which are driven by the magnetic force exerted by a first magnetic field on an electric current. The function of the motor may be to convert electrical energy into mechanical energy. In operation, a wire carrying current may create at least a first magnetic field with magnetic poles in a first orientation which interacts with a second magnetic field with magnetic poles oriented in the opposite direction of the first magnetic pole direction causing a force that may move a rotor in a direction. For example, and without limitation, first magnetic element 208 in motor 200 may include an active magnet. For instance, and without limitation, a second magnetic element may include a passive magnet, a magnet that reacts to a magnetic force generated by first magnetic element 208. In an embodiment, a first magnet positioned around the rotor assembly, may generate magnetic fields to affect the position of the rotor relative to the stator 204. A controller may have an ability to adjust electricity originating from a power supply and, thereby, the magnetic forces generated, to ensure stable rotation of the rotor, independent of the forces induced by the machinery process.

Motor 200 may include impeller 244, coupled with the rotor shaft 236. An impeller, as described herein, is a rotor used to increase or decrease the pressure and flow of a fluid, including at least air. Impeller 244 may function to provide cooling to motor 200. Impeller 244 may include varying blade configurations, such as radial blades, non-radial blades, semi-circular blades and airfoil blades. Impeller 244 may further include single and/or double-sided configurations. Impeller 244 is described in further detail below. Additionally, or alternatively, in a non-limiting illustrative example, rotor shaft 236 may be mechanically coupled to cooling vanes. Cooling vanes are used to lower the temperature of a high-velocity mechanical part, like the rotor in an electrical motor. Cooling vanes may employ a plurality of physical principles to cool mechanical parts. Cooling vanes may draw cool air like a fan if mechanically coupled to the rotor at an angle sufficient to create a pressure differential in order to draw cool air from outside the motor housing into the relatively hot inner motor and cool internal mechanical parts by convection. The cooling vanes may alternatively or additionally cool other components disclosed herein with the impeller. Convection cooling in principle, is cooling of a portion of a body by moving a fluid over it, the tendency of heat energy to move from high to low energy areas, like a hot spinning rotor to cool moving air. Additionally, cooling vanes may act as thermodynamic fins. Heat energy may be conducted through the cooling vanes from the hot rotor shaft to the tips of the cooling vanes, thus dissipating heat in a high-speed rotating part. Cooling vanes may be consistent with those disclosed in U.S. patent application Ser. No. 16/910,255 entitled "Integrated Electric Propulsion Assembly" and incorporated herein by reference in its entirety.

Figure 3:
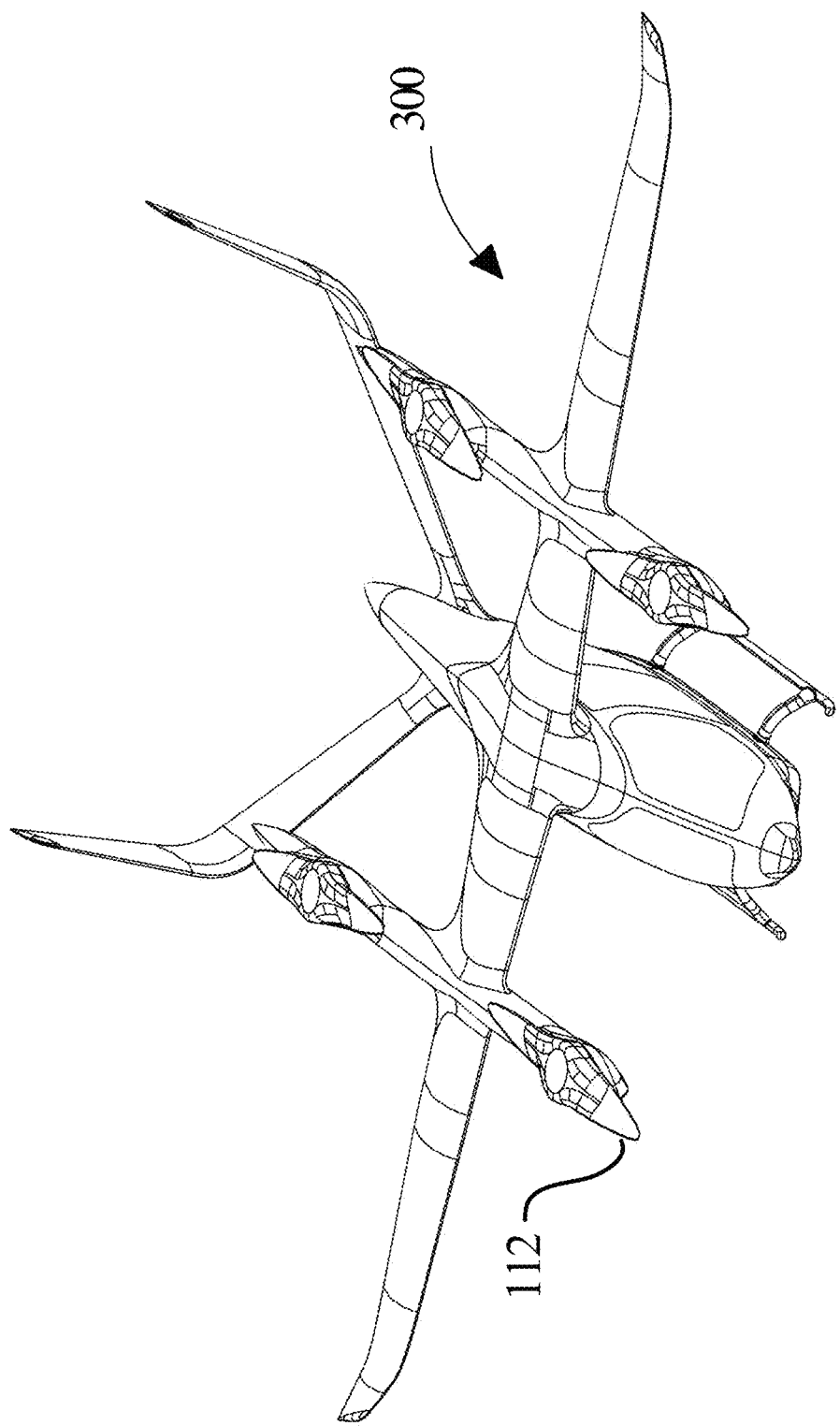
FIG. 3 is a perspective view of a motor incorporated in an electric aircraft according to an embodiment of the disclosure.

Now referring to FIG. 3, an exemplary embodiment of an electric aircraft 300 is illustrated. Electric aircraft 300 may include motor 200 may be mounted on a structural feature of an aircraft. Design of motor 200 may enable it to be installed external to the structural member (such as a boom, nacelle, or fuselage) for easy maintenance access and to minimize accessibility requirements for the structure. This may improve structural efficiency by requiring fewer large holes in the mounting area. This design may include two main holes in the top and bottom of the mounting area to access bearing cartridge. Further, a structural feature may include a component of electric aircraft 300. For example, and without limitation structural feature may be any portion of a vehicle incorporating motor 200, including any vehicle as described below. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 112. Persons skilled in the art, upon reviewing the entirety of this disclosure, will be aware of various materials, combinations of materials, and/or constructions techniques.

Still referring to FIG. 3, electric aircraft 300 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 3, a number of aerodynamic forces may act upon the electric aircraft 300 during flight. Forces acting on electric aircraft 300 during flight may include, without limitation, thrust, the forward force produced by the rotating element of the electric aircraft 300 and acts parallel to the longitudinal axis. Another force acting upon electric aircraft 300 may be, without limitation, drag, which may be defined as a rearward retarding force which is caused by disruption of airflow by any protruding surface of the electric aircraft 300 such as, without limitation, the wing, rotor, and fuselage. Drag may oppose thrust and acts rearward parallel to the relative wind. A further force acting upon electric aircraft 300 may include, without limitation, weight, which may include a combined load of the electric aircraft 300 itself, crew, baggage, and/or fuel. Weight may pull electric aircraft 300 downward due to the force of gravity. An additional force acting on electric aircraft 300 may include, without limitation, lift, which may act to oppose the downward force of weight and may be produced by the dynamic effect of air acting on the airfoil and/or downward thrust from the propulsor 112 of the electric aircraft. Lift generated by the airfoil may depend on speed of airflow, density of air, total area of an airfoil and/or segment thereof, and/or an angle of attack between air and the airfoil. For example, and without limitation, electric aircraft 300 are designed to be as lightweight as possible. Reducing the weight of the aircraft and designing to reduce the number of components is essential to optimize the weight. To save energy, it may be useful to reduce weight of components of electric aircraft 300, including without limitation propulsors and/or propulsion assemblies. In an embodiment, motor 200 may eliminate need for many external structural features that otherwise might be needed to join one component to another component. Motor 200 may also increase energy efficiency by enabling a lower physical propulsor profile, reducing drag and/or wind resistance. This may also increase durability by lessening the extent to which drag and/or wind resistance add to forces acting on electric aircraft 300 and/or propulsors.

Still referring to FIG. 3, electric aircraft 300 can include motor 200. Motor 200 may include a stator which has a first magnetic generating element generating a first magnetic field. Motor 200 may also include propulsor 112 with an integrated rotor assembly of the motor assembly which may include includes a hub mounted to stator, at least a second magnetic element generating a second magnetic field. First magnetic field and second magnetic field vary with respect to time which generates a magnetic force between both causing the rotor assembly to rotate with respect to the stator.

Figure 4:
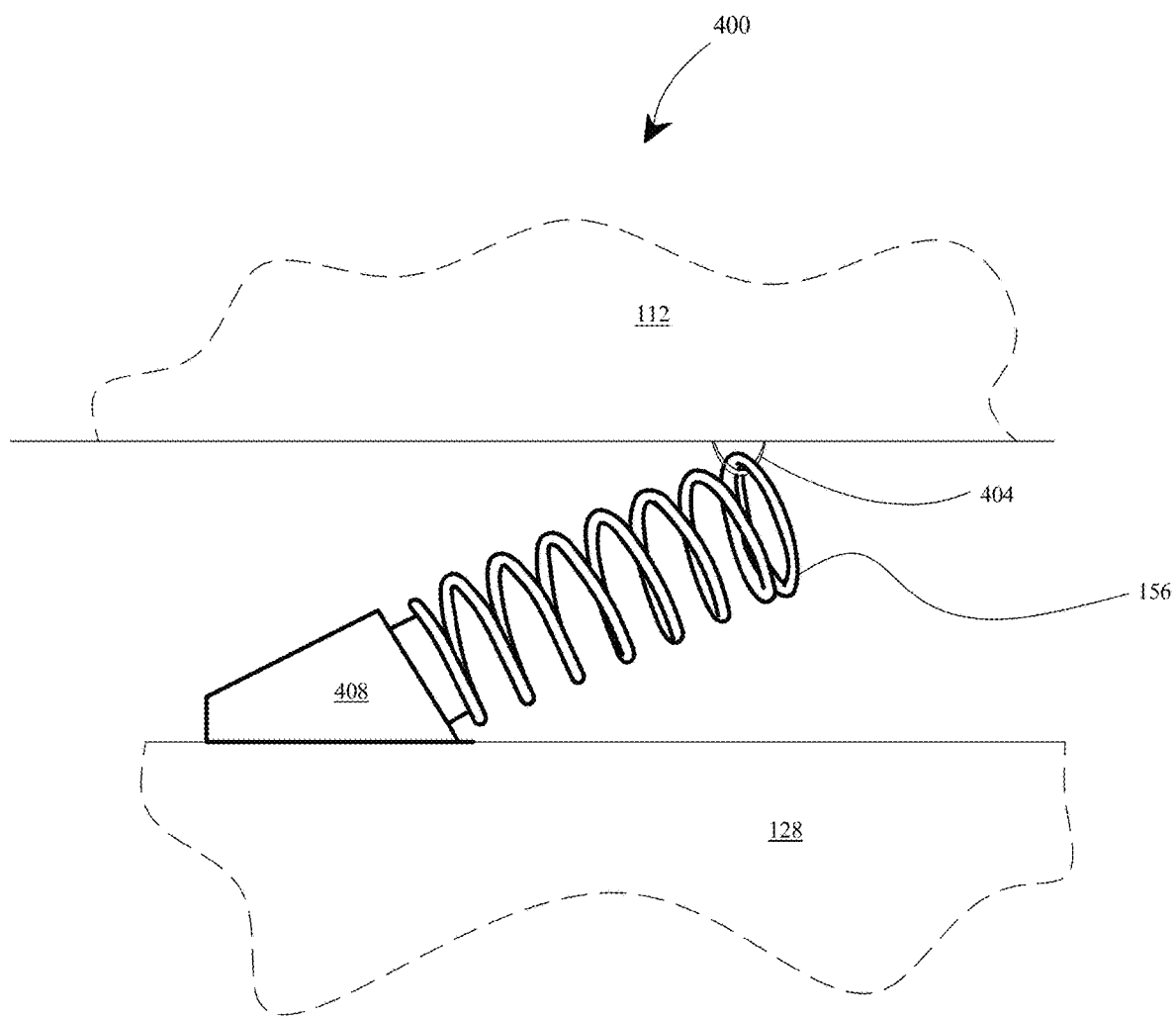
FIG. 4 is a magnified partial view of a locking mechanism according to an embodiment of the disclosure.

Now referring to FIG. 4, a magnified view of a component of parking system 400 is illustrated. Locking mechanism 156 may be connected on a first end to propulsor 112 via a first attachment 404. Locking mechanism 156 may be connected on a second end opposite first end to base 128 via a second attachment 404. Attachment 404 may be a hook, adhesive, screw, and/or the like. In some embodiments first end of locking mechanism 156 and/or second end of locking mechanism 156 may be attached to actuator 408. Actuator 408 may be any actuator described in this disclosure. Actuator 408 may retract to stretch spring of locking mechanism 156, effectively increasing a spring constant of spring and engaging the locking mechanism 156. For example, stretching spring may increase a spring constant that effectively prevents propulsor 112 from teetering on teeter mechanism 124. Locking mechanism 156 may be disengaged by extending actuator 408 to retract spring of locking mechanism 156, which may reduce the spring constant and allow propulsor to teeter on teeter mechanism 124 when a sufficient imbalance of force from edgewise flight overcomes the lower spring constant.

Figure 5:
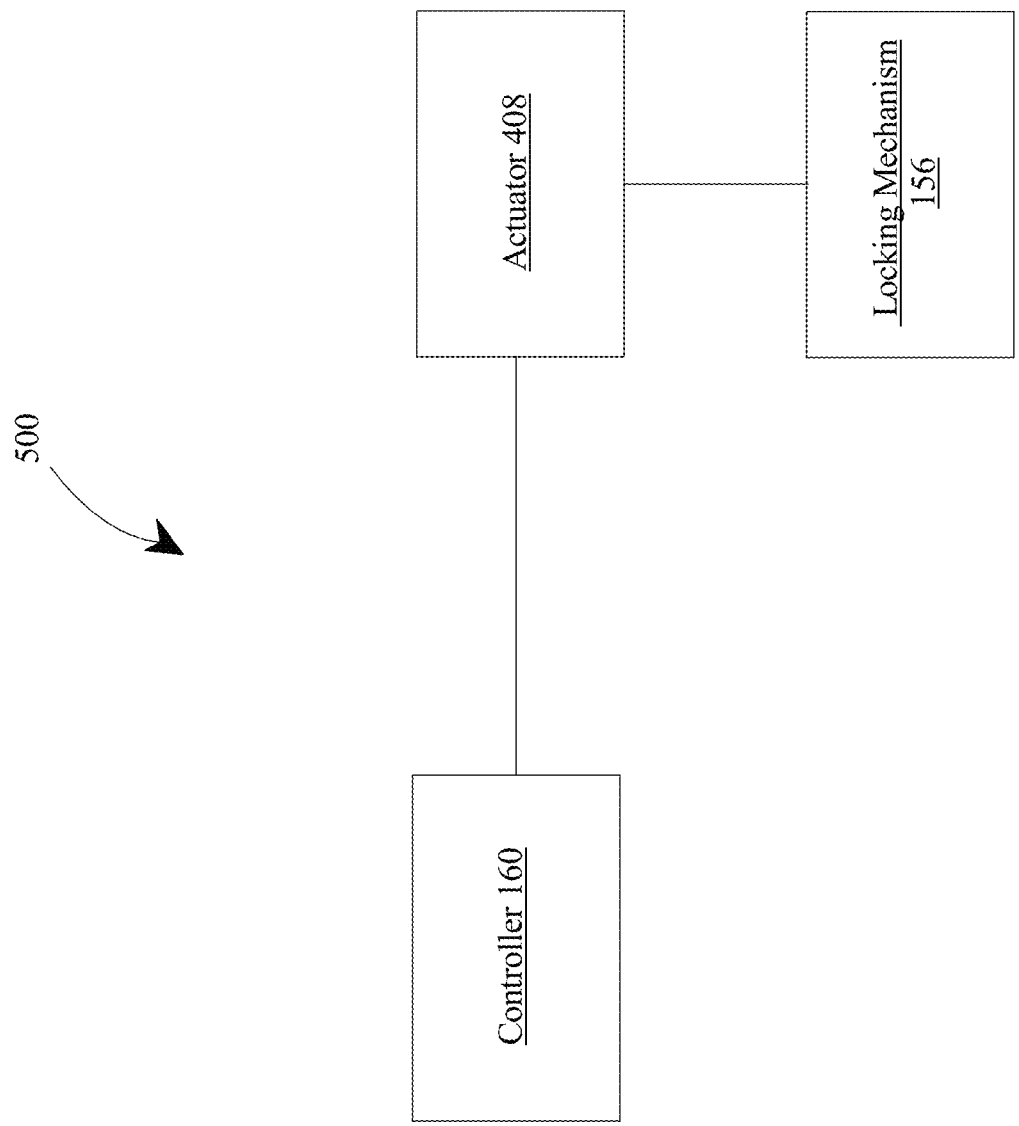
FIG. 5 is a block diagram of a control system for a parking system according to an embodiment of the disclosure.

Now referring to FIG. 5, an exemplary control system 500 for parking teeter mechanism is illustrated. As discussed above, actuator 408 may be controlled by controller 160. Controller 160 may be configured to engage and/or disengage locking mechanism 156. In some embodiments, controller 160 may transmit an engage signal to actuator 408 to engage the actuator 408 and cause locking mechanism 156 to engage. In some embodiments, actuator 408 may extend when disengaged. For example, actuator 408 may be configured to extend to essentially loosen spring, which may disengage the locking mechanism 156. Controller 160 may transmit a disengage signal to actuator 408 to disengage the actuator 408 and cause locking mechanism 156 to disengage. In some embodiments, actuator 408 may retract when engaged. When retracted, actuator 408 may stretch spring and increase a spring constant to effectively engage locking mechanism 156. Controller 160 may adjust a position of actuator 408 and alter a maximum rotational speed of propulsor 112 in which locking mechanism 156 is engaged and prevents the propulsor 112 from teetering about teeter axis B.

Figure 6:
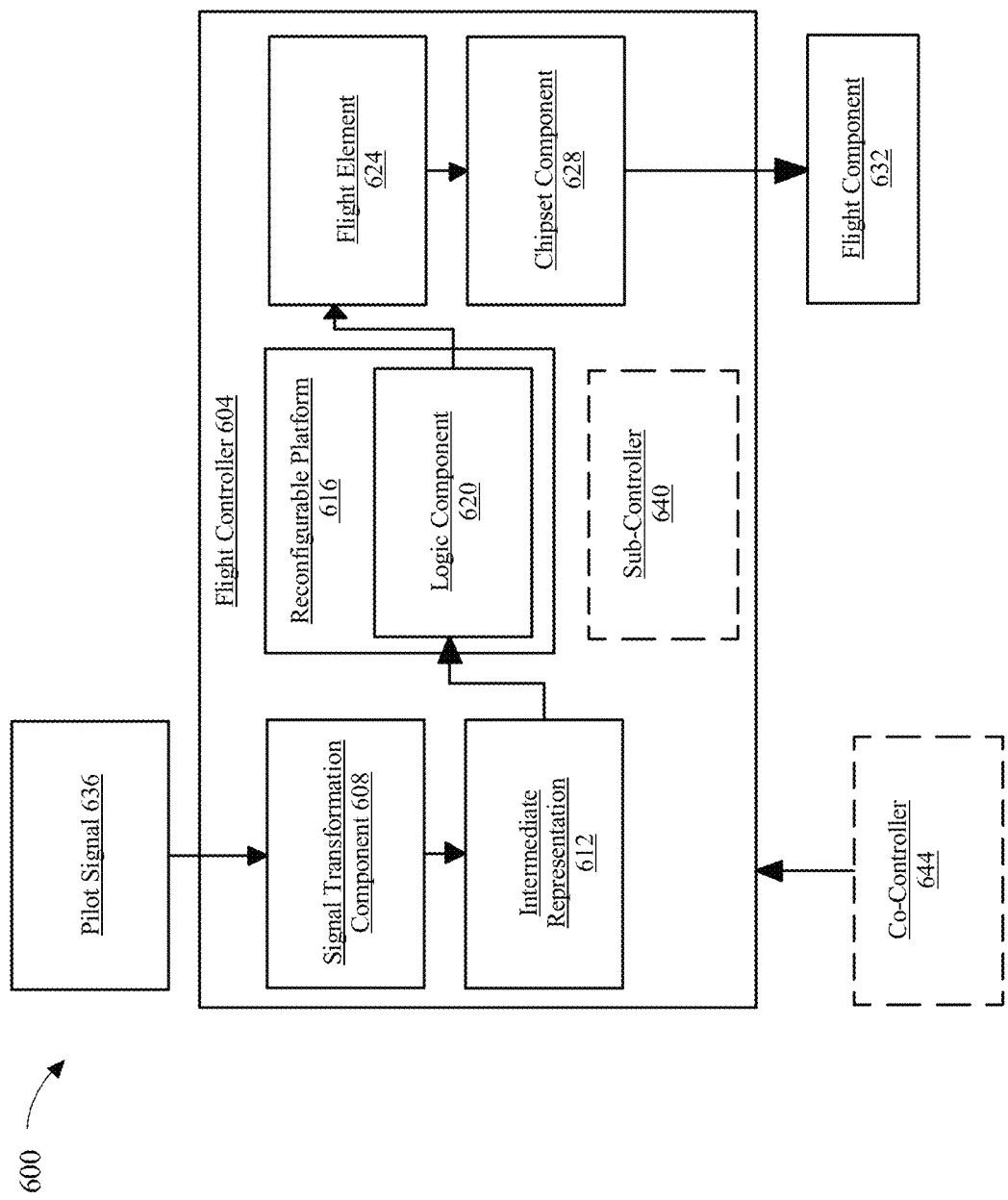
FIG. 6 is a block diagram of a flight controller according to an embodiment of the disclosure.

Now referring to FIG. 6, an exemplary embodiment 600 of a flight controller 604 is illustrated. As used in this disclosure a "flight controller" is a computing device of a plurality of computing devices dedicated to data storage, security, distribution of traffic for load balancing, and flight instruction. Flight controller 604 may include and/or communicate with any computing device as described in this disclosure, including without limitation a microcontroller, microprocessor, digital signal processor (DSP) and/or system on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 628 may manage data flow between logic component 620, memory cache, and a flight component 632. As used in this disclosure a "flight component" is a portion of an aircraft that can be moved or adjusted to affect one or more flight elements. For example, flight component 632 may include a component used to affect the aircrafts' roll and pitch which may comprise one or more ailerons. As a further example, flight component 632 may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

In an embodiment, and still referring to FIG. 6, flight controller 604 may be configured generate an autonomous function. As used in this disclosure an "autonomous function" is a mode and/or function of flight controller 604 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 624. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 604 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 604 will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller 604 may generate autonomous function as a function of an autonomous machine-learning model. As used in this disclosure an "autonomous machine-learning model" is a machine-learning model to produce an autonomous function output given flight element 624 and a pilot signal 636 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 636 may denote that a pilot is controlling and/or maneuvering ailerons, wherein the pilot is not in control of the rudders and/or propulsors. In an embodiment, pilot signal 636 may include an implicit signal and/or an explicit signal. For example, and without limitation, pilot signal 636 may include an explicit signal, wherein the pilot explicitly states there is a lack of control and/or desire for autonomous function. As a further non-limiting example, pilot signal 636 may include an explicit signal directing flight controller 604 to control and/or maintain a portion of aircraft, a portion of the flight plan, the entire aircraft, and/or the entire flight plan. As a further non-limiting example, pilot signal 636 may include an implicit signal, wherein flight controller 604 detects a lack of control such as by a malfunction, torque alteration, flight path deviation, and the like thereof. In an embodiment, and without limitation, pilot signal 636 may include one or more explicit signals to reduce torque, and/or one or more implicit signals that torque may be reduced due to reduction of airspeed velocity. In an embodiment, and without limitation, pilot signal 636 may include one or more local and/or global signals. For example, and without limitation, pilot signal 636 may include a local signal that is transmitted by a pilot and/or crew member. As a further non-limiting example, pilot signal 636 may include a global signal that is transmitted by air traffic control and/or one or more remote users that are in communication with the pilot of aircraft. In an embodiment, pilot signal 636 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller 604 and/or a remote device may or may not use in the generation of autonomous function. As used in this disclosure "remote device" is an external device to flight controller 604. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 604 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller 604 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 604. Remote device and/or FPGA may transmit a signal, bit, datum, or parameter to flight controller 604 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 604 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 632. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers.

For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 604. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above.

In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Now referring to FIG. 7, parking system 700 includes a retractable collar 704. As described above, locking mechanism 156 may include a retractable collar, such as retractable collar 704. Retractable collar 704 may be configured to extend from base 128 of motor 108 toward propulsor 112, preventing the propulsor 112 from teetering on teeter mechanism 124. Retractable collar 704 may be positioned about a circumference of base 128. In some embodiments, retractable collar may include a continuous collar that extends to both sides of teeter axis B. In some embodiments, retractable collar may include individual extenders that extend from base 128 to propulsor 112, wherein at least a first extender is on a first side of teeter axis B and at least a second extender is on a second side of teeter axis B.

Now referring to FIG. 8, a parking system 800 including solenoid 804 is illustrated. As described above, locking mechanism 156 may include solenoid, such as solenoid 804. Solenoid 804 may include a plurality of solenoids. In some embodiments at least one solenoid 804 is positioned on either side of hinge 36 on base 128 of motor 108. Solenoid 804 may be configured to arrest and/or allow teetering of propulsor 112 when energized. Solenoid 804 includes plunger 808 configured to partially extend from coil 812 when current is not applied to solenoid 804. When sufficient current is applied to solenoid 804, the electromagnetic force generated by coil 812 may pull plunger 808 into coil 812. Solenoid may be positioned so plunger 808 may extend orthogonally away from base 128 and toward propulsor 112. Extended plunger 808 may restrict teetering of propulsor 112 to prevent it from teetering on teeter mechanism 124.

Figure 9:
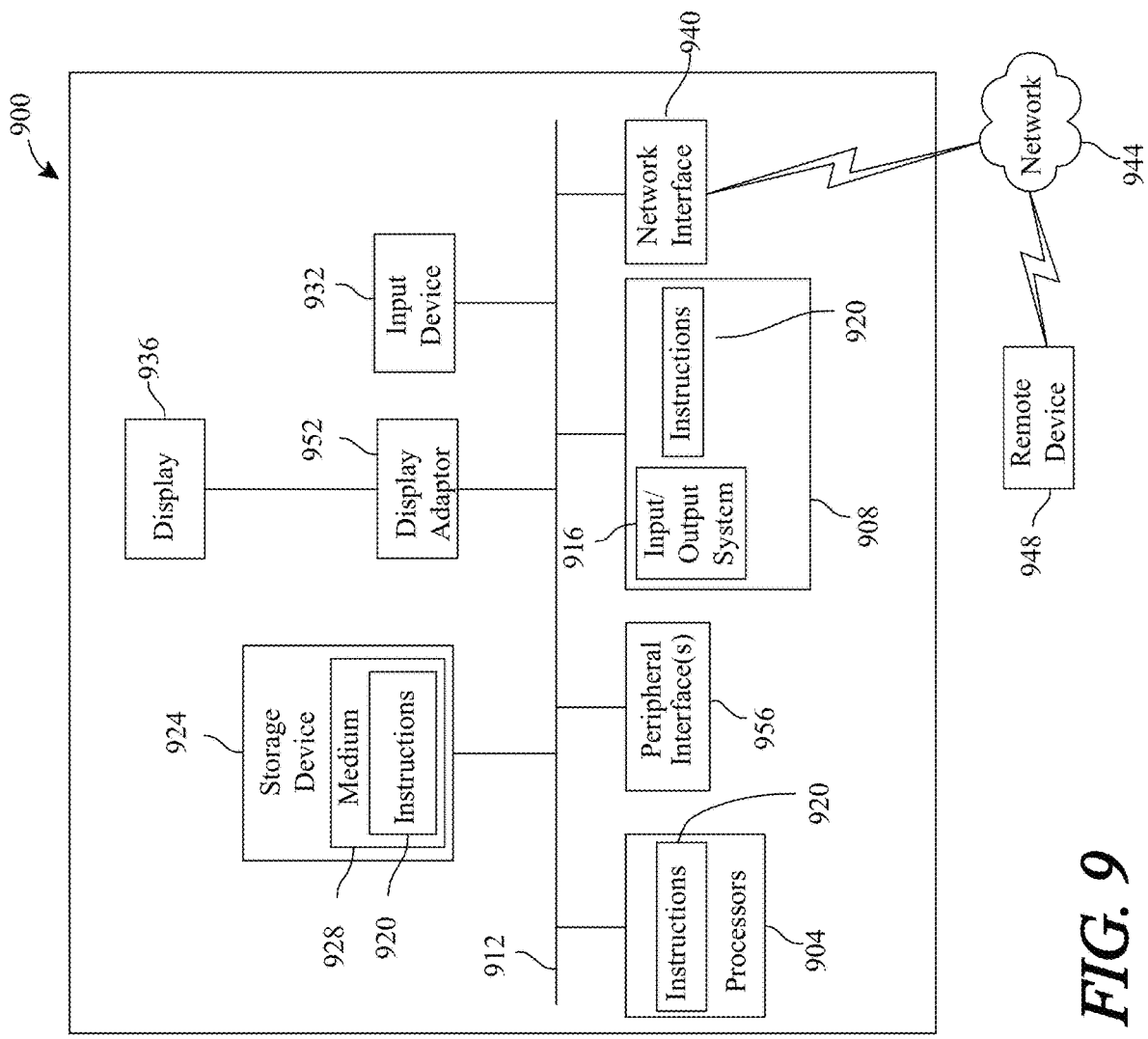
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A locking system for a propulsor teeter of an aircraft, the locking system comprising:
    a propulsor comprising a hub, the hub mechanically connected to a rotor, wherein the hub is configured to rotate about a rotational axis;
    a teeter mechanism connected to the hub, wherein the teeter mechanism is configured to permit a propulsor plane of the propulsor to pivot with respect to a point of intersection between the propulsor plane and the rotational axis of the propulsor; and
    a locking mechanism configured to selectively lock the teeter mechanism while the aircraft is in flight, wherein selectively locking the teeter mechanism restricts the pivoting of the propulsor plane, wherein the locking mechanism comprises a retractable collar.

2. The locking system of claim 1, wherein the locking mechanism comprises an engaged state wherein the pivoting of the propulsor plane is restricted, and the locking mechanism comprises a disengaged state wherein the pivoting of the propulsor plane is unrestricted.

3. The locking system of claim 2, wherein the teeter mechanism comprises a teeter axis, wherein the locking mechanism, when the locking mechanism is in the engaged state, restricts the propulsor plane from pivoting about the teeter axis.

4. The locking system of claim 3, wherein the spring is attached to an actuator.

5. The locking system of claim 2, wherein the locking mechanism is controlled by a controller, wherein the controller is configured to switch the locking mechanism between the engaged state and the disengaged state.

6. The locking system of claim 2, wherein a rotational speed of the propulsor affects whether the locking mechanism is in the engaged state.

7. The locking system of claim 1, wherein the locking mechanism comprises a spring.

8. The locking system of claim 1, wherein the locking mechanism comprises a solenoid.

9. The locking system of claim 1, wherein the aircraft is an electric vertical takeoff and landing (eVTOL) aircraft.

10. A device for locking a propulsor teeter of an aircraft, the device comprising a locking mechanism configured to selectively lock a teeter mechanism while the aircraft is in flight, the teeter mechanism configured to permit a propulsor plane of a propulsor to pivot about a teeter axis with respect to a point of intersection between the propulsor plane and a rotational axis of the propulsor, wherein selectively locking the teeter mechanism restricts the pivoting of the propulsor plane, wherein the locking mechanism comprises:
    a teeter axis;
    an engaged state wherein the pivoting of the propulsor about the teeter axis is restricted; and
    a disengaged state wherein the pivoting of the propulsor about the teeter axis is unrestricted, wherein the locking mechanism comprises a retractable collar.

11. The device of claim 10, wherein the locking mechanism comprises a spring.

12. The device of claim 11, wherein the spring is attached to an actuator.

13. The device of claim 10, wherein the locking mechanism comprises an electromagnet.

14. The device of claim 13, wherein the locking mechanism comprises a solenoid.

15. The device of claim 10, wherein the locking mechanism is controlled by a controller.

16. The device of claim 10, wherein the locking mechanism includes a centering spring configured to recenter the propulsor plane to a position orthogonal to a rotational axis of a rotor mechanically connected to the propulsor.

17. The device of claim 10, wherein a rotational speed of the propulsor affects whether the locking mechanism is in the engaged state.

18. The device of claim 10, wherein the aircraft is an electric vertical takeoff and landing (eVTOL) aircraft.

\* \* \* \* \*